United States Patent [19]
Nobusawa

[11] 3,791,272
[45] Feb. 12, 1974

[54] AUTOMATIC CAMERA SHUTTER CONTROLS WITH STORAGE OR PULSE VOLTAGES

[75] Inventor: Tsukumo Nobusawa, Tokyo, Japan

[73] Assignee: Asaki Kogaku Kogyo Kabushiki Kaisha, Tokyo-to, Japan

[22] Filed: Feb. 5, 1973

[21] Appl. No.: 329,854

[30] Foreign Application Priority Data
Feb. 7, 1972   Japan............................... 47-13418

[52] U.S. Cl. .............................................. 95/10 CT
[51] Int. Cl. ................................................ G03b 7/08
[58] Field of Search.................................. 95/10 CT

[56] References Cited
UNITED STATES PATENTS
3,633,473   1/1972   Yashuhiro................................ 95/10
3,657,979   4/1972   Nobusawa............................... 95/10
3,731,603   5/1973   Ono et al................................. 95/10

Primary Examiner—Samuel S. Matthews
Assistant Examiner—Michael L. Gellner
Attorney, Agent, or Firm—Steinberg & Blake

[57] ABSTRACT

An electrical structure for automatically controlling a camera shutter. The structure includes a pair of memory capacitors for respectively storing voltages in response to pulses received by these memory capacitors, and oscillators are respectively connected electrically with the capacitors for transmitting the pulses thereto. One of the oscillators is operated in accordance with variable factors such as brightness at the object to be photographed, diaphragm setting, and film speed, while the other of the oscillators is operated according to a predetermined reference factor. The memory capacitor which stores a voltage in accordance with this reference factor has its operation started when the camera shutter opens and the voltage of this latter memory capacitor is compared with the voltage of the other memory capacitor. When these voltages have a given relationship with respect to each other a signal is automatically transmitted to a structure which brings about closing of the shutter so as to terminate an exposure.

18 Claims, 12 Drawing Figures

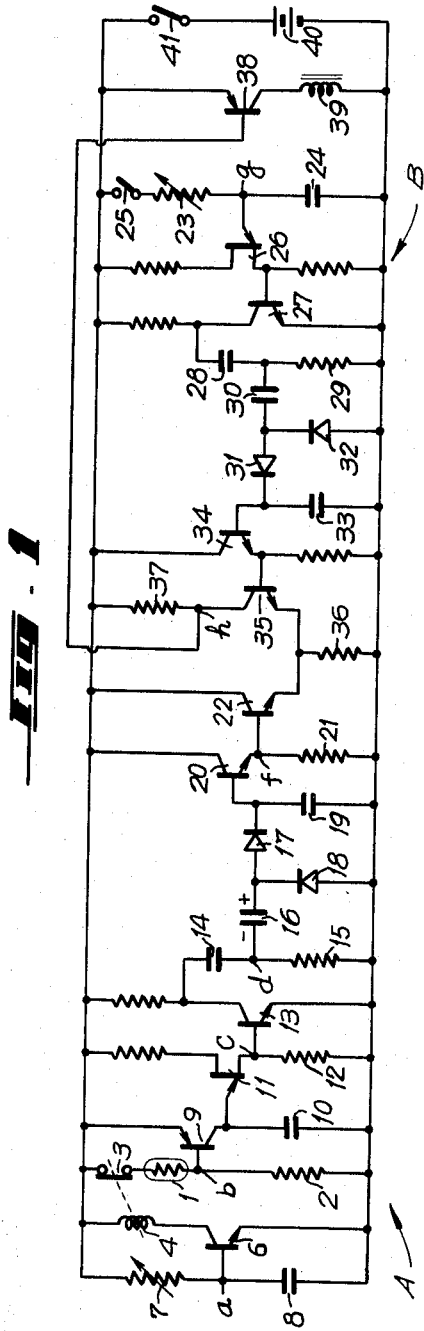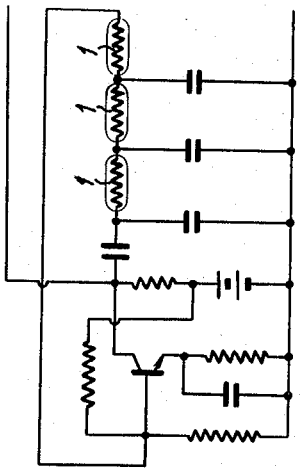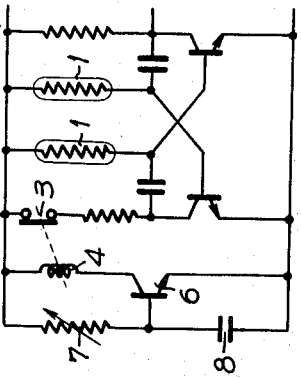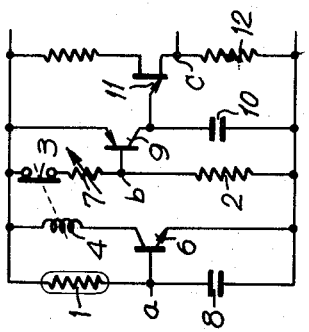

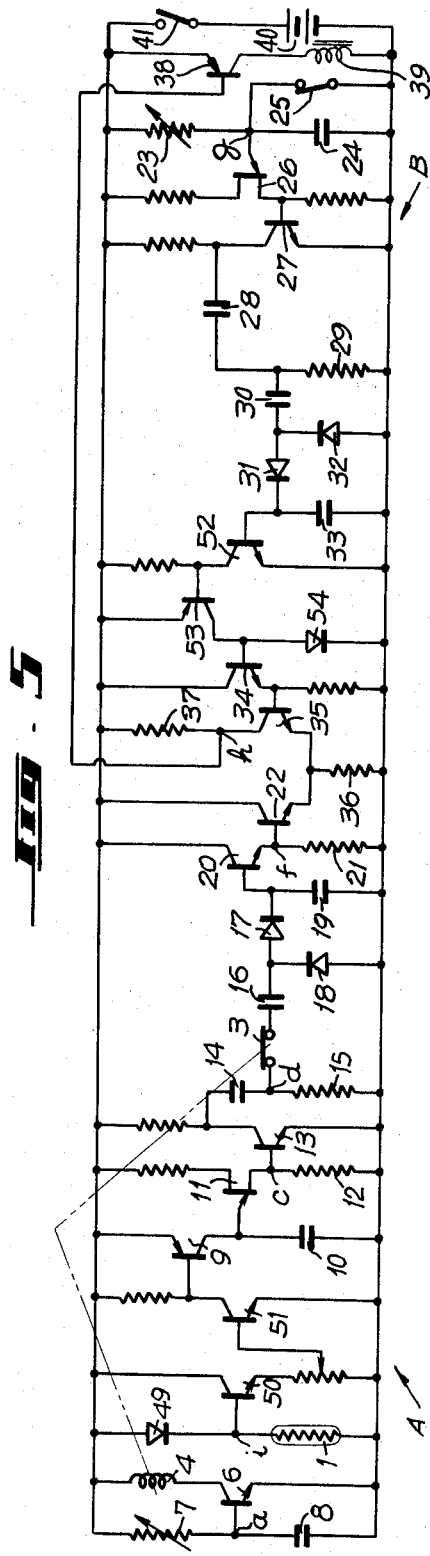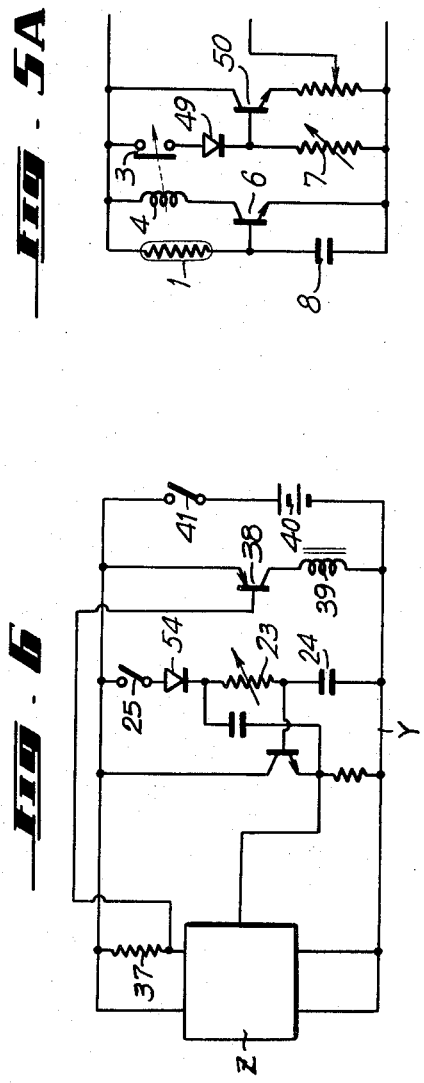

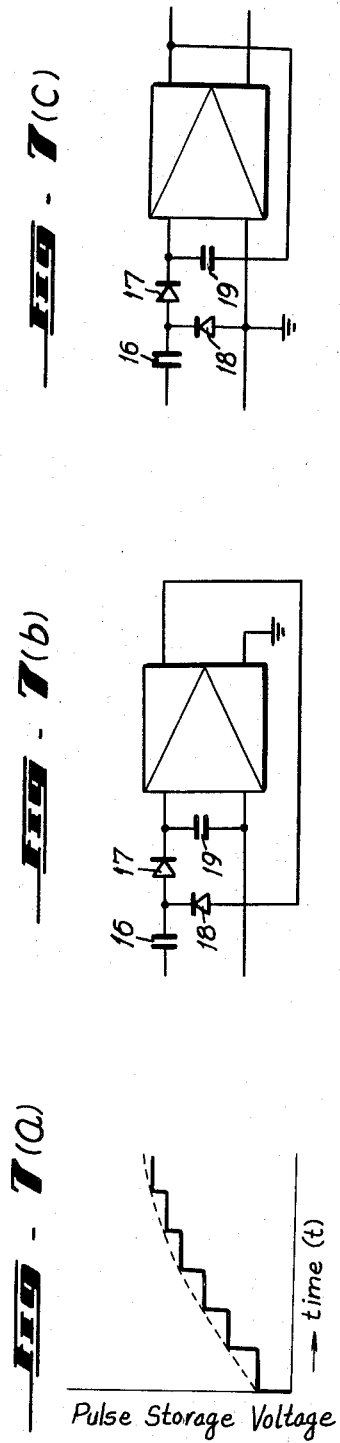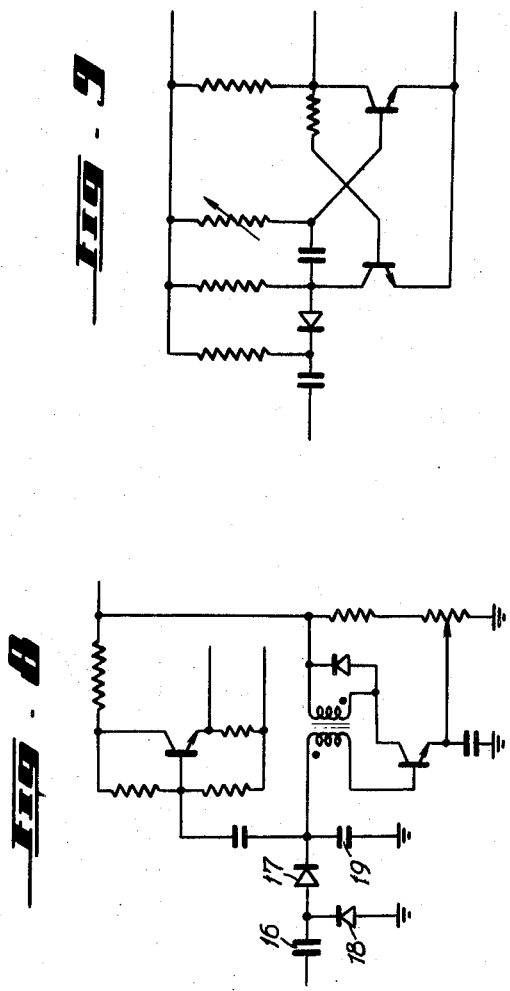

AUTOMATIC CAMERA SHUTTER CONTROLS WITH STORAGE OR PULSE VOLTAGES

BACKGROUND OF THE INVENTION

The present invention relates to cameras.

In particular, the present invention relates to structures for automatically controlling a camera shutter.

Various types of electrical structures for automatically controlling camera shutters are known and some of them have been used commercially. Because of the fact that these structures are capable of automatically regulating the exposure time without requiring operating steps normally required by other types of cameras, the cameras with automatic shutter regulation are very popular. However, conventional cameras of this type have the drawback of being easily influenced by change of temperature at the object which is photographed or in the ambient temperature at the camera. This drawback is encountered because the conventional electrical constructions include many semiconductors. In other words, given operating characteristics of such structures change according to the dependency of the semiconductor components on temperature, so that it is not possible to obtain with such constructions a highly precise determination of exposure time. As a result, systems of the above type have been modified to include compensating circuits which will compensate for temperature changes. The result is, however, that such structures become more complex and more expensive. In addition, shutters which have such compensating circuits do not operate as effectively as expected. In practice very few of these known systems can be considered as having a high quality, from a practical point of view.

An additional factor which provides a serious drawback with conventional constructions resides in the fact that these circuits are operated with batteries which form the source of electricity, and because the energy of such batteries is consumed or because the batteries remain unused for a considerable period of time, the quantity of electrical energy therein decreases, to produce a change in voltage. This change in voltage in turn also results in changing the operating characteristics of the shutter-controlling systems. In this connection it is known to provide such systems with structures for checking the condition of the source of electrical energy, but of course in this case also the structures are rendered more complex and costly by requiring circuits for checking the condition of the electrical source of energy. In addition, such checking systems may indicate whether a battery is properly housed or whether there is a decrease in power, but they are not capable of detecting ordinary, small changes of voltage. It is precisely such small voltage changes, however, which result in inadequate regulation of the exposure time.

SUMMARY OF THE INVENTION

It is accordingly a primary object of the present invention to provide electrical structures which will avoid the above drawbacks.

Thus, it is an object of the present invention to provide an electrical structure for controlling a camera shutter in such a way that temperature variations will have no influence on the structure even though temprature-compensating circuits are not used.

Also, it is an object of the present invention to provide an electrical structure for controlling a camera shutter in such a way that changes in the condition of the source of current will not produce any undesirable effects.

Also, it is an object of the present invention to provide a structure for controlling a camera shutter automatically in such a way that while compression of voltage is utilized for enabling the structure to operate with variables which have a wide range, nevertheless the use of expansion circuits are not required.

In addition, it is an object of the present invention to provide a structure of the above type which is exceedingly simple and inexpensive while capable of achieving exposure times of high accuracy even though temperature fluctuations and changes in the energy source are encountered, without requiring any temperature-compensating circuits or battery-checking circuits.

In accordance with the present invention the electrical structure for automatically controlling the camera shutter has a variable system which includes a memory means for storing a voltage determined by a number of pulses received by this latter memory means, an oscillator means electrically connected with the memory means for transmitting pulses thereto for determining the voltage stored thereby, and an actuating means which is electrically connected with the oscillator means for actuating the latter to transmit to the memory means a number of pulses determined by variable factors such as brightness at the object to be photographed, film speed, and diaphragm setting. A reference system is also provided, and this reference system includes a memory means for storing a voltage determined by pulses received by this latter memory means, an oscillator means electrically connected with this latter memory means of the reference system for transmitting pulses thereto, and an actuating means which is electrically connected with the oscillator means of the reference system for actuating the latter to transmit pulses to the memory means of the reference system in accordance with a predetermined reference factor. A starting means is electrically connected with the actuating means of the reference system for starting the operation thereof upon opening of a camera shutter, and a comparing means is electrically connected with both of the above memory means for comparing with the voltage stored by the memory means of the variable system the voltage stored by the memory means of the reference system as the latter voltage builds. A signal-transmitting means is electrically connected with this comparing means for transmitting a signal therefrom when the voltage of the memory means of the reference system has a predetermined relationship with respect to the voltage of the memory means of the variable system, and a signal-receiving means is electrically connected with the signal-transmitting means for receiving the signal therefrom and then initiating a shutter-closing operation in response to this signal.

Thus, with the present invention it is possible to avoid the drawbacks of conventional shutter-controlling systems, and the desired results can be achieved without the use of temperature-compensating circuits or circuits for checking the electrical source.

According to the invention one pulse storage voltage, which varies according to a variable factor such as brightness of the object to be photographed, is made up of an accumulation of pulses having a number determined in inverse proportion to the brightness of the object to be photographed. Another pulse storage voltage, which increases almost linearly, is made up of an accumulation of pulses the number of which is determined according to a fixed operating cycle or according to a predetermined reference factor. These two pulse storage voltages are compared with each other, and when their relationship satisfies a given condition, a control signal will result, with the shutter action being controlled in response to this control signal.

Although semiconductor elements may be included in the circuitry of the invention, influences resulting from temperature-dependency and change in power source voltage are eliminated in a highly effective manner since the above-mentioned pulse storage voltage is made up of an accumulation of a plurality of pulses achieved from a factor such as the light intensity of the object which is to be photographed. The shutter-controlling signal is achieved after comparing the above pulse storage voltages. As a result, even if each of the pulse storage voltages is influenced to some extent according to temperature fluctuations, the influence of the latter factor can be eliminated.

BRIEF DESCRIPTION OF DRAWINGS

The invention is illustrated by way of example in the accompanying drawings which form part of this application and in which:

FIG. 1 is a wiring diagram illustrating one embodiment of electrical structure according to the present invention;

FIG. 2 is a fragmentary wiring diagram showing a different embodiment of part of the structure of FIG. 1;

FIGS. 3 and 4 are schematic wiring diagrams illustrating, respectively, oscillators which are different from the oscillators used in the embodiment of FIG. 1;

FIG. 5 is a wiring diagram of a further embodiment of the invention utilizing logarithmic compression;

FIG. 5A is a fragmentary wiring diagram of a different embodiment of part of the structure of FIG. 5;

FIG. 6 is a schematic wiring diagram showing a correction circuit;

FIG. 7 (a) is a graph illustrating how the pulse storage voltage builds;

FIG. 7 (b) is a schematic illustration of one type of correction circuit;

FIG. 7 (c) is a schematic illustration of another type of correction circuit;

FIG. 8 is a fragmentary wiring diagram showing in greater detail correction circuits of the type illustrated in FIGS. 6, 7 (b) and 7 (c); and FIG. 9 is a fragmentary wiring diagram showing a circuit which may be included in the structure of the invention for regulating the form of the oscillation pulse.

DESCRIPTION OF PREFERRED EMBODIMENTS

Referring to FIG. 1, there is illustrated therein one embodiment of a structure according to the present invention, this structure including at the left part of FIG. 1 a variable system A and at the right part thereof a reference system B. The variable system A includes a memory means formed by the capacitor 19 for storing a voltage in response to pulses transmitted to the capacitor 19, these pulses being received from an oscillator means which includes the UJT 11. This oscillator means is electrically connected with an actuating means which actuates the oscillator means to provide the pulses which are transmitted to the memory means, and this actuating means includes an operating means for operating the oscillator means. The operating means of the embodiment of FIG. 1 is photosensitive and includes the photoconductor 1 which senses the brightness at the object to be photographed and forms with the series-connected resistor 2 a photoelectric converting circuit. Thus, the photosensitive means 1 is situated at a part of the camera such as behind a window at the front wall of the camera or behind the camera objective for receiving light from the object to be photographed and for responding to this light in order to produce a corresponding out. This actuating means of the variable system A includes in addition to the photosensitive operating means a duration-determining means which determines the duration of operation of the photosensitive operating means, and this duration-determining means includes the relay switch 3 which is connected into the photoelectric converting circuit 1, 2 in series with the photosensitive means 1, this relay switch 3 being controlled by the relay 4. The relay 4 is electrically connected to the collector of a transmistor 6 which controls the photoelectric converting circuit 1, 2 which is connected to the transistor 6 in parallel with the collector and emitter thereof.

The duration-determining means includes a time-limiting circuit composed of the transistor 6 as well as the series-connected time-determining variable resistor 7 and capacitor 8 which are interconnected at a junction $a$ to which the base of transistor 6 is connected. The variable resistor 7 is adjustable in accordance with either one or both of the factors of the speed of the film which is exposed and the selected diaphragm setting, so that the actuating means of the variable system A of FIG. 1 operates according to variables such as film speed, diaphragm setting, and brightness at the object to be photographed, with this latter factor forming the operating means for the oscillating means to determine the frequency of the pulses while the duration of operation is determined by the time-limiting circuit constituted by the elements 6–8 which after a given time interval will cause the relay 4 to open the relay switch 3 and terminate the operation of the oscillating means.

In the illustrated circuit an amplifying transistor 9 has its base connected to the junction $b$ between the resistor 2 and the photoconductor 1, and the collector of the transistor 9 is connected to a capacitor 10. The UJT 11 is a double base diode which oscillates in response to receiving at its emitter the terminal voltage of the capacitor 10. Thus, the oscillating means is formed by the components 9–11 of the variable system A.

The frequency of oscillation of this oscillating means is inversely proportional to the brightness of the object to be photographed. In other words, as this latter brightness increases the oscillating frequency decreases. The first base of UJT 11 is electrically connected to an output resistor 12 by way of a junction $c$ which is electrically connected to the base of a switching transistor 13 which operates in synchronism with the oscillating frequency of UJT 11 so that the pulsations or the "on" and "off" operations are regulated by the transistor 13. Thus, transistor 13 is the transistor for inverting the pulse phase.

The series-connected capacitor 14 and resistor 15 form a differentiating circuit connected in parallel with transistor 13 between the emitter and collector thereof, and the junction $d$ between the capacitor 14 and resistor 15 is electrically connected with capacitor 16 of the pulse storage circuit which includes the memory capacitor 19. This pulse storage circuit is formed by this capacitor 16, a pair of diodes 17 and 18, and the memory capacitor 19. The pulse storage voltage of the memory capacitor 19 is added to the base of transistor 20.

A resistor 21 is connected to the emitter of transistor 20 at a junction $f$ which is connected to the base of a transistor 22 which forms one part of a comparing means, so that the pulse storage voltage of the memory means 19 is supplied in order to bias the voltage of transistor 22.

The above-described circuitry, all the way up to the transistor 22 of the comparing means, forms the variable system A which includes the memory means 19 for receiving the pulses and storing a corresponding voltage, the oscillator means 11 which transmits the pulses to the memory means, and the actuating means 3-8 which actuates the oscillator means to oscillate and produce the pulses in accordance with the variable such as brightness at the object to be photographed, film speed, and diaphragm setting. This variable system A is combined with the reference system B which is almost symmetrical with respect to the system A. Thus, the system B has a memory means formed by the capacitor 33 which corresponds to the capacitor 19 and which also stores a voltage in accordance with pulses received by the capacitor 33, this system B having also an oscillator means formed by a UJT which corresponds to the UJT 11. An actuating means forms part of the system B for actuating the oscillator means to provide the pulses which are stored by the memory means, and the actuating means of the system B actuates the oscillator means according to a predetermined reference factor which is determined by the time-fixing circuit 23, 24. This time-fixing circuit includes the capacitor 24 which is connected in series with the variable resistor 23 which can be adjusted for accurately determining the exposure time as will be apparent from the description which follows. A starting means is provided to start the operation of the actuating means 23, 24, so as to start the operation of the oscillator means and transmission of pulses to the memory capacitor 33, and this starting means includes the switch 25 which is connected in series with the variable resistor 23 and which is closed in synchronism with the opening of the shutter in a well known manner. Thus, the switch 25 is normally open and is closed at the instant when the shutter opens, so that the reference system B starts to accumulate pulses and thus builds the voltage stored by the capacitor 33 when the shutter opens. The emitter of UJT 26 is connected to the junction $g$ between the resistor 23 and capacitor 24. Thus, the reference factor which determines the oscillating frequency of UJT 26 is formed by the time-fixing circuit 23, 24 which has a given time-fixing number which will determine the constant operating frequency of the oscillator means.

The UJT 26 is connected to the transistor 27 which corresponds to the transistor 14 of the variable system A and which serves to invert the pulse phase, while the reference system B has a differentiating circuit formed by capacitor 28 and resistor 29 and corresponding to the differentiating circuit 14, 15 of the variable system A. The pulse storage circuit of the reference system B is of the same construction as the pulse storage circuit of the variable system A and includes at the second step of the differentiating circuit 28, 29 the capacitor 30, the diodes 31 and 32, and the memory capacitor 33. The transistor 34 corresponds to the transistor 20 and serves to transmit or supply the pulse storage voltage of the pulse storage circuit of reference system B directly to the second transistor 35 of the comparing means. The transistors 22 and 35 of the comparing means have a common emitter resistor 36 connected to the emitters of transistors 22 and 35. Thus, upon closing of the switch 25 which forms the starting means for the reference system B the voltage which builds at the memory capacitor 33 is compared with the voltage stored at the memory capacitor 19. The transistor 35 is connected with an output resistor 37 by way of a junction $h$, this structure forming a single-transmitting means for transmitting a signal when a predetermined relationship between the stored pulse voltages is detected by the comparing means. In the illustrated example when the voltage stored by capacitor 33 is determined to be equal to the voltage stored by capacitor 19, the output resistor 37 will through the junction $h$ transmit a signal through a suitable conductor to a signal-receiving means which includes the transistor 38 whose base is connected to the junction $h$. This transistor 38 is electrically connected with an electromagnet 39 which in response to the control provided through the transistor 38 will initiate a shutter-closing operation. Thus the transistor 38 upon receiving the signal from the comparing means 22, 35 will actuate the electromagnet 39 in order to release the shutter so that it can assume its closed position and terminate the exposure.

The circuit further includes the power source formed by the battery 40 and the switch 41 for closing the entire circuit.

With the embodiment of FIG. 1, when the shutter-tripping plunger of the camera is depressed, the initial part of the movement of this shutter-tripping plunger will close the switch 41 in a well known manner, and thus current will be simultaneously supplied to the time-limiting circuit 6-8, the photoelectric converting circuit 1, 2, and the differentiating circuit 14, 15 of the variable system A, while at the same time current will also be supplied to the differentiating circuit 28, 29 of the reference system B. Therefore, at this time, before the shutter actually opens, the photoelectric converting circuit 1, 2 carries out the photoelectric conversion according to the brightness of the object to be photographed so as to raise the electric potential at the junction $b$. When this electric potential at junction $b$ reaches a given value, it becomes equal to the trigger voltage required to operate UJT 11, and thus UJT 11 will perform the first oscillation to create the first pulse. This initial oscillation of UJT 11 elevates the electric potential at the junction $c$, of the first base of UJT 11, so that transistor 13 for inverting the phase turns "on" and the charge already stored at the capacitor 14 of the differentiating circuit 14, 15 is discharged through the transistor 13. This discharge of capacitor 14 displaces the anode side of diode 18 to a positive electric potential, while the junction $d$ then has a negative electrical potential due to the decrease in the voltage of the resistor 15, and in this way charging of the capacitor 16 is carried out with the polarity illustrated in FIG. 1. On the other hand, UJT 11 by its oscillation discharges the capacitor 10 and the electrical potential of the emitter of UJT 11 is lowered so as to terminate the oscillation. Inasmuch as only the electrical potential from the pulse voltage is present at the junction $c$, transistor 13 assumes its "off" condition, immediately after it was turned "on". This assuming of its "off" condition by the transistor 13 restores the differentiating circuit 14, 15 so that the capacitor 14 is again charged from the power source battery 40. At this time the junction $d$ has a rising positive electrical potential so that the charge stored at the capacitor 16 is discharged. In other words, due to the rise of the positive electrical potential at junction $d$, the previously accumulated charge of capacitor 16 is transmitted to the memory capacitor 19 through the diodes 17. In this way one photoelectrically converted pulse has been transmitted to the memory means of the pulse storage circuit. In the same way subsequent photoelectrically converted pulses are transmitted sequentially to the memory means. However, since the cycle of the photoelectrically converting pulses is determined by the oscillating frequency of UJT 11, the oscillating frequency, or in other words the cycle for each photoelectrically converted pulse, becomes smaller as the brightness of the object to be photographed is less while as this brightness becomes greater the operating cycle for each pulse requires a longer time.

Thus, in the manner described above the oscillating means will create the pulses which form the voltage stored by the memory means 19, and this operation continues until the time-limiting circuit 6–8, which forms the duration-determining means, causes the relay 4 to open the switch 3. Thus, the time-limiting circuit 6–8 will terminate the operation of the oscillating means fter a given time determined only by the setting of the variable resistor 7 irrespective of the brightness of the object to be photographed. This latter factor of brightness of the object to be photographed determines the frequency of the pulses, as pointed out above, and the interval during which the pulses occur is determined by a completely different variable factor such as the film speed or diaphragm setting, or both, in accordance with which the variable resistor 7 is adjusted. Thus, subsequent to closing of the power source switch 41, the transistor 6 is rendered conductive so that relay 4 is energized to open the normally closed relay switch 3, and thus there is an interruption in the supply of current to the photoelectric converting circuit 1, 2, with the result that oscillation of UJT 11 is also terminated. Therefore, voltage accumulated by the sequential transmission of pulses to the memory capacitor 19 is added to the base of transistor 22 of the comparing means through the transistor 20 which determines the amplification of the electric current of transistor 22. Therefore, the emitter of the other transistor 35 of the comparing means has a condition of elevated electrical potential resulting from the dropping voltage of the emitter resistor 36 as a result of the amplification of the electrical current of the transistor 22.

All of the above operations are in preparation for the initial shutter relase operation, or in other words a tripping of the shutter so that it assumes an open position during which exposure is made. The continued depression of the shutter-operating plunger of the camera will trip the shutter, causing it to open, and simultaneously through a suitable unillustrated transmission the starting switch 25 is closed, so that the reference system B now operates with the actuating means formed by the time-fixing circuit 23, 24 now operating to raise the electrical potential at the junction $g$ in accordance with the reference factor determined by the setting of the variable resistor 23. As a result the potential at the junction $g$ will rise to the level required to trigger UJT 26, and now the oscillating means of reference system B starts oscillating to transmit pulses to the memory capacitor 33 of the pulse storage circuit, in precisely the same way as in the case of the variable system A. UJT 26 oscillates at a predetermined frequency determined by the time-fixing number of the time-fixing circuit 23, 24, so that in accordance with this latter reference factor oscillation pulses will be transmitted sequentially to the memory capacitor 33 to be stored thereby in the form of an accumulating or building voltage. This voltage which builds at the memory capacitor 33 is added in the form of a bias voltage to the transistor 35 of the comparing means through the transistor 34 so that the base voltage of transistor 3 gradually rises as oscillation of UJT 26 continues. When the voltage stored at memory capacitor 33 becomes equal to the voltage stored at memory capacitor 19 of the variable system A, transistor 35 stops operating and becomes non-conductive, and at this time the electrical potential of the junction $h$ of the collector of transistor 35 drops sharply so that the signal-transmitting means operates to transmit a signal to the transistor 38 which forms the signal-receiving means for receiving from the signal-transmitting means a signal indicating that the predetermined relationship between the stored voltages of memory means 19 and 33 has been reached. This transmission of the signal to the transistor 39 will thus render the latter conductive so that power will now be transmitted to the electromagnet 39, energizing the latter so as to initiate the shutter-closing operation. In other words the shutter will normally be maintained in its open position by a pawl or the like which holds the shutter in its open condition against the force of a spring which tends to close the shutter, and the energized electromagnet will displace the pawl to a release position releasing the shutter so that it can assume its closed condition. Thus, one complete operating cycle for exposing a film frame has taken place.

The above explanation of course assumes that the factors of the preselected diaphragm setting and the speed of the film which is exposed and other possible factors in connection with making the photograph, other than light intensity at the object to be photographed, have been taken into consideration and introduced into the systems. Thus, in accordance with these other factors the variable resistor 7 of the variable system A or the variable resistor 23 of the reference system B are adjusted in accordance with these variable factors. The influence of these latter factors is illustrated by the following:

At first, the oscillation cycle $T_1$ of UJT 11 belonging to system A is:

$$T_1 = R_1 C_1 l_n [1/(1-\mu)] \tag{1}$$

$R_1$ : the inner resistance value of transistor 9
$C_1$ : capacity value of capacitor 10
$\eta$ : stand-off rate and fixed number of UJT 11

The terminal voltage $V_{cl}$ of memory capacitor 19 of system A is:

$$V_{cl} = k_1 f_1 \tag{2}$$

Therefore, the following formula can be gained from $f = 1/T$ and the above-mentioned formulas (1) and (2).

$$f_1 = \frac{1}{T_1} = \frac{1}{R_1 C_1 l_n \frac{1}{1-\eta}} \quad (3)$$

Further, $R_1$ is fixed to be the reciprocal number of the inner resistance value $R_o$ of the photoconductor as shown in the diagram. Therefore, $$R_1 = k_2 (1/R_o) \quad (4)$$

In this formula is put in the above-mentioned formula (3), $$f_1 = \frac{R_o}{k_2 C_1 l_n \frac{1}{1-\eta}} \quad (5)$$

Then if this formula is put into the above-mentioned (2), $$V_{c_1} = \frac{k_1 R_o}{k_2 C_1 l_n \frac{1}{1-\eta}} \quad (6)$$

As shown in the formula clearly, the pulse storage voltage in the memory capacitor 19 changes in inverse proportion to the brightness of the object to be photographed.

Next, the oscillation cycle $T_2$ of UJT 26 of system B is as follows.

$$T_2 = R_2 C_2 l_n [1/(1-\eta)] \quad (7)$$

$$\therefore f_2 = \frac{1}{R_2 C_2 l_n \frac{1}{1-\eta}} \quad (8)$$

Also, the terminal voltage $V_{c2}$ of memory capacitor 33 of pulse storage circuit of system B is as follows.

$$V_{c2} = k_3 f_2 \quad (9)$$

If this formula is put into the above-mentioned (8), $$V_{c_2} = \frac{k_3}{R_2 C_2 l_n \frac{1}{1-\eta}} \quad (10)$$

$R_2$ : resistance value of the time fixing resistor 23
$C_2$ : capacity value of capacitor 21
$k_3$ : fixed number As stated above, the closing of shutter is carried out in the condition of $V_{c1} - V_{c2}$ so that if the above-mentioned (6) and (10) formulas are the same value, $$\frac{k_1 R_o}{k_2 C_1 l_n \frac{1}{1-\eta}} = \frac{k_3}{R_2 C_2 l_n \frac{1}{1-\eta}} \quad (11)$$

Here, suppose that the stand-off rate $\eta$ of UJT 11 and UJT 26 uses the same parts and that the capacitor 10 and 24 are selected to realize $C_1 - C_2$. Then the following formula will be gained from (11) formula $$R_2 - k (1/R_o) ; k : k_3 \times k_2/k_1 \text{ (fixed number)}$$

(12)

Thus, it follows that the same value condition of the comparing means or comparing circuit can be satisfied in the time-fixing resistor 23 in the time-fixing circuit of reference system B is changed in a manner which is inversely proportional to the internal resistance of photoconductor 1. It is therefore possible to add such factors as preselected diaphragm setting and film speed by changing the brightness of the object to be photographed in accordance with a multitude order with respect to the brightness of the object to be phtographed.

In the above embodiment of FIG. 1 the photoelectric converting circuit 1, 2 is directly opened by the time-limiting circuit 6–8 as described above. As long as the circuit which includes the capacitor 16 is interrupted by the time-limiting circuit 6–8, the relay switch 3 can be situated at any part of this circuit which renders the capacitor 16 conductive, so that upon opening of the switch 3 the circuit which includes the capacitor 16 is interrupted.

Referring now to FIG. 2, there is fragmentarily illustrated therein a different embodiment of part of the variable system A. Thus, as may be seen from FIG. 2, the operating means for operating the oscillator means includes the variable resistor 7 which replaces the photoconductor 1 of FIG. 1. Thus, with this embodiment the timing resistor 7 which is adjusted so as to have a resistance value according to the speed of the film which is exposed and/or a selected diaphragm setting, acts on the UJT 11 to control the latter in its sequential "on" and "off" operation at a constant frequency determined in accordance with the film speed and/or diaphragm setting. Thus, with this embodiment it is the time-limiting circuit which generates in the memory capacitor 19 of the variable system A the pulse storage voltage which in fact corresponds to the light intensity at the object to be photographed, as will be apparent from the description below.

Thus, with the embodiment of FIG. 2, the relay 4 is controlled by the duration-determining circuit which in the embodiment of FIG. 2 includes the photoconductor 1. Thus with the embodiment of FIG. 2 the oscillator means will oscillate at a constant frequency determined by the setting of the variable resistor 7 and the duration of the operation will be determined in accordance with the brightness at the object to be photographed. As a result the relay 4 will be energized to open the switch 3 after a relatively short duration when the light intensity is relatively high, so that the number of pulses stored at the capacitor 19 will be relatively small. On the other hand, when the light intensity is relatively low the duration of operation before energizing of the relay 4 will be relatively long and the number of pulses stored at memory capacitor 19 will be relatively high. Thus, a relatively high voltage is stored by the memory capacitor 19 when the light intensity is relatively low and a relatively low voltage is stored by the memory capacitor 19 when the light intensity is relatively high. Thus, the reference system B which provides the voltage to be compared with the voltage stored by the memory capacitor 19 and which is the same as that of FIG. 1 will still provide for opening and closing of the shutter in the manner described above in connection with FIG. 1. Thus, with the embodiment of FIG. 2 the range of oscillation frequency of UJT 11 corresponds to the range of variation of such exposure factors as film speed and/or diaphragm setting. As a result, as compared with the embodiment of FIG. 1, the range of oscillation frequency required for the UJT 11 in FIG. 2 can be narrowed so as to utilize more effectively the UJT 11 of the embodiment of FIG. 2 than with the embodiment of FIG. 1.

FIGS. 3 and 4 respectively illustrate other possible forms for the oscillator means. Thus, in FIG. 3 there is illustrated an oscillator means in the form of a known self-running multivibrator, and this structure is used to replace the UJT 11 of FIG. 1. Thus, except for the construction of the oscillator means, the multivibrator of FIG. 3 being used to replace the UJT 11 of FIG. 1, the embodiment of FIG. 3 is the same as that of FIG. 1.

With the embodiment of FIG. 4 the oscillator means takes the form of an RC phase-shifting oscillator which replaces UJT 11 of FIG. 1. Thus the embodiment of FIG. 4 also is identical with that of FIG. 1 except that instead of UJT 11 of FIGS. 1 the RC phase-shifting oscillator illustrated in FIG. 4 is used. Inasmuch as the oscillator means of FIG. 4 will carry out a sine wave oscillation, pulse formation is carried out in a well known manner by adding the wave forming circuit.

FIG. 5 illustrates a further embodiment of the invention which is particularly suitable for achieving satisfactory shutter control even in situations where there is a wide range of brightness at the object to be photographed. This is brought about with the embodiment of FIG. 5 by compressing the two pulse storage voltages which initially vary geometrically through a relatively large range into voltages which have an arithmetic rate of increase, thus bringing about a compression of the voltages. Thus, in the case of the embodiment of FIG. 1, the pulse storage voltage of capacitor 19 where the photoelectrically converted pulses are stored varies through a wide range along a multitude order because of the geometric progression so that when a large or wide range of light intensity is encountered, the range of the voltage stored at the capacitor 19 also must be great. As a result, the actual control of the shutter becomes possible only within a predetermined range of change of light intensity at the object to be photographed.

For example, if it is assumed that the shutter speed or exposure time can range from 1 milisecond up to 1 second, then the voltage range which must be stored is at a rate of 1:1000. If the minimum pulse storage voltage is 1 mV, the maximum must be 1 V. In the same way, if the minimum pulse storage voltage is 10 mV, the maximum required is 10 V. Therefore the maximum voltage becomes relatively high and it is not practical for an electrical shutter of the type encountered in cameras. With the embodiment of FIG. 5, however, logarithmic compression is effected with respect to the information converted from light intensity, which varies according to a geometric progression, as pointed out above, in order to make the possible range of light intensity which can be handled much greater and thus the above-mentioned pulse storage voltage is converted by the logarithmic compression into a voltage which changes according to an arithmetic progression.

Referring now to FIG. 5, it will be seen that a logarithmic compression diode 49 is connected in series with the photoconductor 1. Therefore, the junction $i$ between the diode 49 and the photoconductor 1 transmits through the amplifying transistors 50 and 51 to the base of the transistor 9 a quantity from the converted light intensity which is arithmetic form and which is present at the junction $i$ to be supplied to the base of the transistor 9 through the amplifying transistors 50 and 51.

On the other hand, with the reference system B of FIG. 5, the pulse storage voltage at the memory capacitor 33 is compressed by way of a logarithmic compression diode 54 which is electrically connected to the capacitor 33 through the amplification transistors 52 and 53. The oscillation pulse information which is thus compressed by the diode 54 is then supplied to the base of transistor 34 and then to the transistor 35 of the comparing means 22, 35. As a result, with the embodiment of FIG. 5 both of the transistors 22 and 35 of the comparing means are regulated so that a comparison of compressed pulse storage voltage takes place in order to control the shutter operation. With this embodiment the duration during which the shutter is maintined open by the time during which UJT 26 oscillates is determined by the comparing means which transmits the signal for initiating the shutter closing operation when the voltage transmitted to the comparing transistor 35 equals that transmitted to the comparing resistor 22. As a result it is not necessary to include in the circuit of FIG. 5 an expansion circuit according to which either of the compressed voltages is subsequently logarithmically expanded to its initial form.

A further change in the embodiment of FIG. 5, as compared with that of FIG. 1, resides in the fact that the starting means for starting the oscillation of UJT 26 is formed by the switch 25 which in this case is connected in parallel with the capacitor 24 of the timing circuit 23, 24 which determines the oscillaton of reference system B according to a predetermined reference factor as pointed out above. Thus, with the embodiment of FIG. 5 the starting switch 25, instead of being a normally open switch as in the case with FIG. 1, is a normally closed switch bridging the capacitor 24 so as to prevent the latter from operating until the switch 25 opens. With this embodiment the shutter upon opening will through a suitable transmission bring about simultaneous and synchronous opening of the switch 25 of FIG. 5 to start the oscillation of UJT 26 as described above.

Except for the above features the embodiment of FIG. 5 is identical with that of FIG. 1 and operates in the same way.

FIG. 6 illustrates an embodiment in which the reference system B includes a correction circuit means for providing a linear inclination in the reference voltage which is compared by the comparing means with the voltage stored by the memory capacitor 19. In order to simplify the illustration the block Z of FIG. 6 includes the entire variable system A and the comparing means. The reference system B is illustrated in FIG. 6 as including a correction circuit formed by the boot strap circuit Y. This is a well known circuit which generates a voltage having a linear inclination, so that the shutter is controlled by comparing the latter voltage with the pulse storage voltage.

Thus, if the pulse storage voltage of the variable system A is V, $$V = k L^{-1}$$

$k$ : constant
$L$ : light intensity of the object to be photographed
The generation voltage $V'$ of boot strap is as follows.

$$V' \cong (E/R\,C)\,t$$

$E$ : power source voltage
$R$ : time fixing resistance value
$C$ : time fixing capacitor's capacity value
$t$ : process time
The action of shutter is as follows.

$$V = V'$$
$$k\,L^{-1} \cong (E/R\,C)\,t$$
$$t \cong (R\,C\,K/E)\,L^{-1} \cong K\,L^{-1}\,K : R\,C\,K/E)$$

It is clear, therefore, that $t$ corresponds to the light intensity of the object to be photographed, and the shutter time can be determined in accordance with this latter time $t$. However, in the case of compressing the pulse storage voltage, as described above in connection with the embodiment of FIG. 5, it is necessary to carry out the logarithmic conversion of the generation voltage of the boot strap circuit. Furthermore, it appears that the memory capacitors 19 and 33 of the pulse storage circuits of FIGS. 1 and 5 raise voltage linearly whenever the conversion information of one pulse is received. Actually, however, this latter raising of the voltage is non-linear.

This is demonstrated by the following formulas. First the pulse storage voltage is $V_1$ when the first pulse is received by memory capacitor 19 or 33, $$V_1 = C_1/(C_1 - C_2) \qquad (13)$$

$C_1$ : capacity value of capacitor 16 or 30
$C_2$ : capacity value of memory capacitor 19 or 33
$E$ : amplitude of pulse The pulse $e$ charged in the capacitor 16 or 30 of the pulse storage circuit is generally same as the charge quantity $e'$ when the charge time fixing number is small compared with the converting pulse width, so that $e = e'$.

Next, when the second pulse enters, the pulse storage voltage $V_2$ is as follows.

$$V_2 = (e - V_1)\,C_1/C_1 + C_2) = e\,[1 - C_1/(C_1+C_2)\,][C_1/(C_1+C_2)]$$
$$= [C_1 C_2/(C_1+C_2)^2]\,e$$

(14)

$$\therefore V_1 + V_2 = e\left[1 - \left(\frac{C_2}{C_1+C_2}\right)^2\right]$$

Suppose pulses of $n$ pieces enter, $$V = e\left[1 - \left(\frac{C_2}{C_1+C_2}\right)^n\right] \qquad (15)$$

When the calculation is carried out by giving 1, 2, 3 ... to the $n$ value, the $V$ value becomes the non-linear characteristic as in FIG. 7 (a).

The reason why it becomes non-linear is the existence of $V_1$ in $V_2 = (e - V_1)\,[C_1/(C_1 + C_2)]$ of the formula (14). In case the additional charge is carried out, it is because of influence of the storage voltage formed by the electric charge remaining already in the capacitor. In order to get the linear characteristic of pulse storage voltage, some method must be taken. The simple way is to enlarge $C_2/(C_1 + C_2)$ maing $C_2 > C_1$ or to enlarge the amplitude of the pulse converted from the light intensity of the object to be photographed. However, these methods must be decided in conformity with the design of electric shutter.

The best method concerning this to add the positive feedback voltage to the memory capacitor. That is to give a result as though the influence of photoelectrically converted pulse stored has been removed. For instance, if the positive feedback voltage is $V_1$, the following formula can be gained from the formula (14).

$$V_2 = (e - V_1 + V_1)\,[C_1/(C_2 + C_1)] = e\,[C_1/(C_1 + C_2)]$$

Accordingly, if pulses of $n$ pieces enter, $V = e\,[C_1/(C_1 + C_2)\,] \times n$ Thus the pulse storage voltage $V$ is in proportion to the pulse number.

FIGS. 7 (b) and 7 (c) are simplified diagrammatic illustrations of a boot strap circuit and a mirror circuit, which are widely known for providing feedback to the capacitor.

The boot strap circuit means of FIG. 7 (b) provides a feedback through the amplifier of gain + 1 so that there is a positive feedback, while in the case of the mirror circuit means of FIG. 7 (c) the feedback is carried out through the amplifier with a gain − 1, so that this circuit provides a negative feedback. Actually, however, the linear correction can be carried out as ($e - V_1 - V_1) - e$ from the connection of the circuits. (However, the illustrated circuit is an example where it is added to the pulse storage circuit of variable system A.)

FIG. 8 illustrates the pulse storage circuit of the variable system A with the linear correction circuits which are shown in greater detail than in FIGS. 7 (b) and 7 (c).

Referring to FIG. 9, there is illustrated therein a single stability multivibrator circuit for improving the form of the oscillation pulse which is used to charge the memory capacitors 19 or 33. By connecting the multivibrator means of FIG. 9 to the output side of UJT 11 or UJT 26, the form of the oscillation pulse is best selected in equilibrium with the time fixing number of the pulse storage circuit. Thus, the operation of the shutter is improved by utilizing the linear correction circuits in the pulse storage means and by utilizing the improvement circuit of FIG. 9 for determining the pulse form.

Referring now to FIG. 5A, the fragmentarily illustrated wiring diagram corresponds to FIG. 5 in the same way that FIG. 2 corresponds to FIG. 1. Thus, it will be noted that with FIG. 5A the photoconductor 1 of FIG. 5 is replaced by the variable resistor 7 and instead the photoconductor 1 is utilized as part of the time-limiting circuit. Thus, with the embodiment of FIG. 5A the frequency of oscillation of UJT 11 will be constant as determined by the setting of the variable resistor 7 in accordance with the factor of film speed and/or diaphragm aperture, while the duration-determining means includes the photoconductor 1 so that the interval during which the oscillator means is maintained oscillating is determined in accordance with the brightness at the object to be photographed. Otherwise the embodiment of FIG. 5A is the same as that of FIG. 5. It will be noted that in FIG. 5A the logarithmic compression diode is connected in series with the variable resistor 7 while the relay switch 3 is connected in series with the logarithmic compression diode 49.

It is therefore apparent that with all of the above embodiments of the invention the pulse storage voltage varies according to the brightness of the object to be photographed, at the variable system A, while at the reference system B there is also a pulse storage voltage which rises in an almost linear form, and in accordance with the comparison between these voltages the operation of the shutter is controlled as a result of the control signal resulting from the comparison of the voltages. As a result, the influence of temperature fluctuations which may result from a change in the light intensity of the object to be photographed or from fluctuations of ambient temperature can be reduced to a minimum, and at the same time the control of the shutter is not changed by any change of the power source voltage due to consumption of the power source battery.

In addition, the shutter operation can be accurately carried out even with a wide variation in light intensity by compressing the pulse storage voltage so that it assumes the characteristics of an arithmetic voltage, and the operation of the shutter is further improved by utilizing the various correction circuits, as for example those shown in FIGS. 8 and 9, in order to correct the rising voltage so that there is a linear increase in voltage and in order to provide a desired pulse form. Thus, with the present invention the drawbacks of conventional electrical shutter controls resulting from temperature dependency are eliminated without utilizing a temperature compensating circuit, and at the same time the exposure time is determined in a highly precise manner even if the voltage of the battery or other electrical source of energy changes.

What is claimed is:

1. In an electrical structure for automatically controlling a camera shutter, a variable system including memory means for storing a voltage determined by a number of pulses received by said memory means, oscillator means electrically connected with said memory means for transmitting pulses thereto for determining the voltage stored thereby, and actuating means electrically connected with said oscillator means for actuating the latter to transmit to said memory means a number of pulses determined by variable factors such as brightness at the object to be photographed, film speed, and diaphragm setting, a reference system including a memory means for storing a voltage determined by pulses received by the latter memory means, an oscillator means electrically connected with said memory means of said reference system for transmitting pulses thereto, and actuating means electrically connected with said oscillator means of said reference system for actuating the latter to transmit pulses to said memory means of said reference system in accordance with a predetermined reference factor, starting means electrically connected with said actuating means of said reference system for starting the operation thereof upon opening of a camera shutter, comparing means electrically connected with both of said memory means for comparing with the voltage stored by said memory means of said variable system the voltage stored by said memory means of said reference system as the latter voltage builds, signal-transmitting means electrically connected with said comparing means for transmitting a signal therefrom when the voltage of said memory means of said reference system has a predetermined relationship with respect to the voltage of said memory means of said variable system, and signal-receiving means electrically connected with said signal-transmitting means for receiving said signal therefrom and initiating a shutter-closing operation upon receiving said signal.

2. The combination of claim 1 and wherein said memory means of said reference system provides for the building voltage stored thereby a rate of increase which is at least approximately linear.

3. The combination of claim 1 and wherein a pair of logarithmic compression means are respectively connected electrically with said systems for providing at said pair of memory means compressed voltages to be stored thereby, respectively.

4. The combination of claim 1 and wherein said actuating means of said variable system includes an operating means electrically connected with said oscillator means of said variable system for operating the latter to produce pulses in accordance with one of said variable factors and a duration-determining means electrically connected with said operating means for determining the duration of operation thereof in accordance with another of said variable factors.

5. The combination of claim 4 and wherein said operating means includes a photosensitive means for responding to brightness at the object to be photographed and said operating means operating said oscillator means of said variable system at a frequency determined by said brightness.

6. The combination of claim 4 and wherein said duration-determining means includes a photosensitive means for responding to brightness at the object to be photographed for determining the duration of operation of said operating means in accordance with said brightness, said operating means operating said actuating means of said variable system at a constant frequency.

7. The combination of claim 1 and wherein at least one of said oscillator means includes a UJT.

8. The combination of claim 1 and wherein at least one of said oscillator means includes a multivibrator.

9. The combination of claim 1 and wherein at least one of said oscillator means includes an RC phase-shifting oscillator.

10. The combination of claim 1 and wherein a longarithmic-compression diode is electrically connected with said actuating means of said variable system for logarithmically compressing the voltage stored by said memory means of said variable system and wherein a logarithmic-compression diode is electrically connected with said memory of said reference system for logarithmically compressing the voltage stored thereby, so that said comparing means compares logarithmically compressed voltages.

11. The combination of claim 10 and wherein said actuating means of said variable system includes a photosensitive operating means electrically connected with said oscillator means of said variable system for oscillating the latter at a frequency determined by the brightness at the object to be photographed, said logarithmic-compression diode of said variable system being connected in series with said photosensitive operating means, and said actuating means of said variable system including a duration-determining means electrically connected with said operating means for determining the duration of operation thereof, said duration-determining means including a variable resistor which is adjustable in accordance with at least one of the variable factors other than brightness at the object to be photographed.

12. The combination of claim 10 and wherein said actuating means of said variable system includes an operating means electrically connected with said oscillator means of said variable system for operating said oscillator means, and said operating means including a variable resistor adjustable according to one of said variable factors other than brightness at the object to be photographed, for operating said oscillator means of said variable system at a frequency which is constant and determined by the setting of said variable resistor, said logarithmic-compression diode of said variable system being connected in series with said variable resistor, and said actuating means of said variable system including a photosensitive duration-determining means electrically connected with said operating means for determining the duration of operation thereof in accordance with the brightness and the object to be photographed.

13. The combination of claim 1 and wherein a correction circuit means is electrically connected with at least one of said memory means for providing a feedback which corrects the voltage stored by said latter memory means into a linear form.

14. The combination of claim 13 and wherein said correction circuit means is in the form of a boot strap circuit which provides a positive feedback.

15. The combination of claim 13 and wherein said correction circuit means is in the form of a mirror circuit which provides a negative feedback.

16. The combination of claim 1 and wherein a multivibrator circuit means is electrically connected between said oscillator means and said memory means of at least one of said systems for regulating the form of the oscillation pulse received by said memory means of said one system.

17. The combination of claim 16 and wherein said multivibrator circuit means is in the form of a single stability multivibrator circuit.

18. The combination of claim 1 and wherein a correction circuit means and a pulse-form regulating circuit means are electrically connected with said memory means of at least one of said systems for respectively producing linearity in the voltage stored thereby and regulating the form of the oscillation pulse received by the latter memory means.

* * * * *